United States Patent

Hashimoto et al.

Patent Number: 6,124,013
Date of Patent: Sep. 26, 2000

[54] MAGNETIC RECORDING MEDIUM

[75] Inventors: Hiroshi Hashimoto; Hitoshi Noguchi, both of Odawara, Japan

[73] Assignee: Fuji Photo Film Co., Ltd., Kanagawa, Japan

[21] Appl. No.: 09/081,945

[22] Filed: May 21, 1998

[30] Foreign Application Priority Data

May 21, 1997 [JP] Japan ................................. 9-130821

[51] Int. Cl.$^7$ ............................ B32B 3/02; B32B 5/16; G11B 5/70
[52] U.S. Cl. ................. 428/65.4; 428/328; 428/694 BP; 428/900; 428/329
[58] Field of Search ..................... 428/323, 328, 428/329, 688, 694 BP, 694 BC, 694 BM, 64.2, 65.3, 65.6, 65.4, 689, 694 BN, 694 BA, 900

[56] References Cited

U.S. PATENT DOCUMENTS

| | | | |
|---|---|---|---|
| 4,197,357 | 4/1980 | Huisman | 428/539 |
| 4,420,532 | 12/1983 | Yamaguchi et al. | 428/329 |
| 4,474,848 | 10/1984 | Yamaguchi et al. | 428/329 |
| 4,713,293 | 12/1987 | Asano et al. | 428/403 |
| 4,748,084 | 5/1988 | Hata et al. | 428/425.9 |
| 4,952,458 | 8/1990 | Miyoshi et al. | 428/323 |
| 4,985,314 | 1/1991 | Merriam et al. | 428/694 |
| 5,049,448 | 9/1991 | Ohya et al. | 428/409 |
| 5,053,289 | 10/1991 | Nishikawa et al. | 428/694 |
| 5,061,564 | 10/1991 | Ohya et al. | 428/409 |
| 5,091,268 | 2/1992 | Nishikawa et al. | 428/694 |
| 5,112,680 | 5/1992 | Inaba et al. | 428/329 |
| 5,126,202 | 6/1992 | Inaba et al. | 428/402 |
| 5,336,559 | 8/1994 | Yamagishi et al. | 428/329 |
| 5,397,826 | 3/1995 | Wexler | 524/356 |
| 5,436,070 | 7/1995 | Schroer et al. | 428/323 |
| 5,688,591 | 11/1997 | Kuwajima et al. | 428/323 |

FOREIGN PATENT DOCUMENTS

| | | |
|---|---|---|
| 62-119727 | 6/1978 | Japan . |
| 59-165238 | 9/1984 | Japan . |
| 09293235 | 11/1997 | Japan . |
| 10320760 | 12/1998 | Japan . |

Primary Examiner—Paul Thibodeau
Assistant Examiner—Sheeba Ahmed
Attorney, Agent, or Firm—Sughrue, Mion, Zinn, Macpeak & Seas, PLLC

[57] ABSTRACT

The present invention provides a magnetic recording medium for high density recording, which has very good repeated running durability and excellent storage stability under high temperature and high humidity conditions. The magnetic recording medium comprises a magnetic layer having ferromagnetic powder and a binder dispersed therein, said magnetic layer being provided on a non-magnetic support, whereby said magnetic layer contains a diester compound expressed by a chemical formula (1) given below:

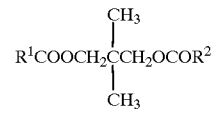

(1)

where $R^1$ and $R^2$ each represents a saturated hydrocarbon group having 5 to 21 carbon atoms, and at least one substance selected from a group of organic phosphorus compounds expressed by the chemical formulae (2) to (4):

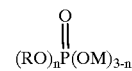

(2)

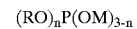

(3)

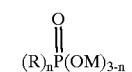

(4)

where R represents a substituted or unsubstituted alkyl group, alkenyl group or aryl group, and n represents 1 or 2, and M represents a hydrogen atom, an alkali metal or an alkali earth metal.

16 Claims, No Drawings

MAGNETIC RECORDING MEDIUM

BACKGROUND OF THE INVENTION

The present invention relates to a magnetic recording medium with excellent electromagnetic transfer characteristics and high durability, whereby the medium comprises a magnetic layer having ferromagnetic powder and a binder dispersed in it, and the magnetic layer is provided on a non-magnetic support, and in particular to a magnetic recording medium suitable for high-speed rotating disk.

The magnetic recording medium is widely used in such applications as recording tape, video tape, floppy disk, etc. The magnetic recording medium comprises a magnetic layer having ferromagnetic powder and a binder dispersed in it, and the magnetic layer is laminated on a non-magnetic support.

The magnetic recording medium must be at high level in such characteristics as electromagnetic transfer characteristics, running durability, and running performance. Specifically, an audio tape for reproducing musical sound must have an ability to reproduce original sound with higher quality. A video tape must have high electromagnetic transfer characteristics such as high ability to reproduce original image or picture.

Together with the requirements to have high electromagnetic transfer characteristics, the magnetic recording medium must have good running durability as described above. To ensure good running durability, an abrasive material and a lubricant are generally added in the magnetic layer.

However, in order to ensure good running durability by the use of an abrasive material, it is necessary to increase the adding quantity of the abrasive material to some extent, and this leads to the decrease of filling ratio of ferromagnetic material. Also, in case an abrasive material having large particle size is used to ensure good running durability, the abrasive material is very likely to protrude from the surface of the magnetic layer. Therefore, the improvement of the running durability using the abrasive material often leads to deterioration of the electromagnetic transfer characteristics.

In order to improve the running durability by the use of a lubricant, it is necessary to increase the adding quantity of the lubricant. As a result, the binder becomes easily plasticized, or durability of the magnetic layer may be decreased, or pasting or sticking may occur when large quantity of lubricant is used.

JP-A-59-65931 describes a magnetic recording medium using a lubricant, which comprises a diester of neopentylglycol, trimethylol propane, and pentaerythritol with fatty acid and ethylene oxide denatured ester. When this is applied in a tape for high recording density as currently used, repeated running durability is not satisfactory and such problems as head contamination, output decrease, etc. arise.

JP-B-66-18063 describes a diester of carboxylic acid and dihydric alcohol as lubricant, and JP-B-72-14648 describes a diester of dicarboxylic acid. JP-A-56-80829 describes an aliphatic dibasic acid ester, and JP-A-59-28236 describes a substance, which comprises dibasic acid ester having a specific chemical structure and a graphite with a specific average particle size. Further, JP-A-59-186129 describes a magnetic recording medium using dioleyl maleate.

However, in all of the substances of the above inventions, storage stability and resistance to hydrolysis are low, and durability is decreased during long-term storage under high temperature and high humidity conditions. In the application for a tape with high recording density, repeated running durability is not satisfactory.

JP-A-61-139921 describes a magnetic recording medium having a magnetic layer, which contains a fatty acid ester of polyhydric alcohol and phosphoric acid ester of phenylpolyethylene glycol. However, its dispersion property is not satisfactory. Polyethylene glycol portion is too soft and unsatisfactory in strength and durability. Ethylene glycol portion is low in thermal stability and long-term storage property.

JP-A-7-73450 describes a magnetic recording medium having a magnetic layer, which comprises a dibasic acid ester with a specific chemical structure as lubricant. However, its durability is not satisfactory and storage stability is low. Also, the binder is easily plasticized, strength is decreased, and calender roll is easily contaminated.

JP-A-7-192250 describes a magnetic recording medium, which comprises a diester containing dihydric alcohol and unsaturated fatty acid. As examples, description is given on simultaneous use of dioleate of neopentyl glycol with stearic acid and butyl stearate. However, it is not satisfactory in durability and storage property, and it is disadvantageous in that calender roll is likely to be contaminated in the manufacturing process.

It is an object of the present invention to provide a magnetic recording medium having high repeated running durability, and also to provide a magnetic recording medium, which has high running durability at low temperature and good storage stability under high temperature and high humidity conditions, has roll contamination unlikely to occur in calender process, exhibits high productivity and has high dispersion property, dispersion stability and high electromagnetic transfer characteristics.

SUMMARY OF THE INVENTION

The present invention provides a magnetic recording medium, which comprises a magnetic layer having ferromagnetic powder and a binder dispersed therein, said magnetic layer being provided on a non-magnetic support, whereby said magnetic layer contains a diester compound expressed by a chemical formula (1) given below:

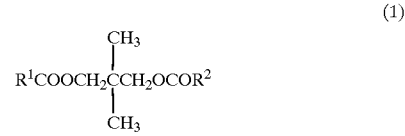

where $R^1$ and $R^2$ each represents a saturated hydrocarbon group having 5 to 21 carbon atoms, and at least one substance selected from a group of organic phosphorus compounds expressed by the chemical formulae (2) to (4):

where R represents a substituted or unsubstituted alkyl group, alkenyl group or aryl group, and n represents 1 or 2, and M represents a hydrogen atom, an alkali metal or an alkali earth metal. In particular, it represents at least one element selected from a group of hydrogen atom, sodium, potassium, and calcium.

Also, the present invention provides a magnetic recording medium described above, wherein said magnetic layer contains unsaturated fatty acid having 12 to 22 carbon atoms.

The invention also provides a magnetic recording medium as described above, wherein a non-magnetic layer having inorganic powder dispersed in a binder is provided between said non-magnetic support and the magnetic layer, and thickness of said magnetic layer is not more than 1 μm when dried.

The present invention also provides a magnetic recording medium as described above, wherein the ferromagnetic powder contains aluminum in an amount of 1 to 20 atomic % when it is supposed that iron atoms are contained in the ferromagnetic powder in an amount of 100 atomic %.

Further, the present invention provides a magnetic recording medium as described above, wherein said magnetic recording medium is a magnetic disk used in a recording and reproducing system with number of revolutions of not lower than 700 rpm.

DESCRIPTION OF THE PREFERRED EMBODIMENTS

The diester type lubricant used in the present invention has affinity with the binder and shows high lubricating performance and good running durability even when the quantity of the lubricant in the surface of the magnetic layer is low. In general, when the quantity of lubricant is increased in the surface of the magnetic layer, blocking is likely to occur during storage or pasting (or sticking) may occur on the magnetic recording medium. Because the quantity of the lubricant in the surface of the magnetic layer is low in the present invention, no problem occurs such as pasting (or sticking). The surface of the magnetic layer is not softened, and contamination of calender roll does not occur. Also, flaw-resistant property of the surface of the magnetic layer is satisfactory.

This is because an organic phosphorus compound having ferromagnetic powder or inorganic powder with very good dispersion property is used in the present invention. The use of an ordinary type sulfonic acid salt is disadvantageous in that it is easily detached even when it is adsorbed once. Unlike such type of polar group, the organic phosphorus compound is unlikely to be detached once it is adsorbed to ferromagnetic powder or inorganic powder. It has good dispersion property and dispersion storage property. By combining two types of substances with such properties, it is possible to obtain a magnetic recording medium, which has good electromagnetic transfer characteristic and running durability, high storage property at low temperature and with no calender contamination.

Also, the diester type lubricant has excellent fluid lubricating property. It has stronger interaction between molecules because there are two ester groups in a molecule. In case temperature is increased due to friction heat between a head rotating at high speed and a tape or between a disk rotating at high speed and a head, the lubricant of the present invention does not become volatile due to high interaction between molecules and can maintain stable fluid lubrication without exhaustion of the lubricating film.

Further, the diester of the present invention has high compatibility with vinyl chloride type resin binder or polyurethane resin binder. In particular, in case it is applied in a magnetic disk rotating at a speed of 700 rpm or more, the lubricant compatible in the binder gradually comes up to the surface, and high lubricating function can be provided even in long-term use.

A conventional type lubricant comprising diester has high compatibility with the binder and has a property to plasticize the binder. This results in the decrease of strength of the magnetic layer or reduces flaw-resistant property when the magnetic layer is scratched under high pressure and at low speed. Also, foreign objects may be attached on roll during calender process, and this leads to contamination of roll and to lower productivity. In the organic phosphorus compound of the present invention, the decrease of strength of the coated film is suppressed. High fluid lubricating property is provided, and strength of the surface of coated film is maintained.

In this connection, if the present invention is applied to a magnetic disk for a magnetic disk system of high recording density rotated at high speed (700 rpm or more), it is possible to provide a magnetic disk, which shows high durability, high flaw-resistant property, has low possibility to develop roll contamination in calender process, and attains high productivity.

If unsaturated fatty acid is used in addition to the use of the diester and the organic phosphorus compound of the present invention, it is preferable because durability at low temperature is improved. This is attributable to cumulative effect with the diester and the organic phosphorus compound of the present invention.

In the present invention, if the ferromagnetic metal powder contains aluminum in an amount of 1 to 20 atomic % to the iron when it is supposed that iron atoms are contained in an amount of 100 atomic % in the ferromagnetic powder, storage stability can be improved under high temperature and high humidity conditions. Diester has high hydrophilic property, high moisture absorbing property and is easily hydrolyzed. These problems are aggravated by catalytic activity on the surface of the ferromagnetic powder, and diester becomes easily decomposable when it is stored under high temperature and high humidity conditions. In case of the ferromagnetic metal powder which contains aluminum in an amount of 1 to 20 atomic % to the iron, the above influence is reduced and it becomes non-decomposable. As a result, even when it is stored under high temperature and high humidity conditions, durability is not decreased almost at all, and the initial property of the disk before storage can be maintained.

In the diester compound expressed by the formula (1) of the present invention, $R^1$ and $R^2$ each represents a saturated hydrocarbon group having 5 to 21 carbon atoms and may be of branched type or saturated type. $R^1$ and $R^2$ are preferably identical with each other, or more preferably saturated straight chain or saturated branched alkyl group.

In $R^1$ and $R^2$, if the number of carbon atoms is less than 5, volatility is increased. Due to high temperature caused by friction, the surface of the magnetic layer will be exhausted more, and this results in poor durability. If the number of carbon atoms is more than 21, viscosity increases, and fluid lubricating performance is decreased. In $R^1$ and $R^2$, the number of carbon atoms is preferably 7 to 17, or more preferably 9 to 13.

In case the magnetic layer is a single layer, it is preferable that it contains the diester compound in 0.1 to 10 weight parts to 100 weight parts of the ferromagnetic powder, or more preferably, in 1 to 5 weight parts. If it is contained more, pasting or sticking may occur at low speed friction.

In case the magnetic layer is designed as multiple layer, diester compound may be added to either the upper layer or the lower layer, or may be added to both layers. In case it is added only to the lower layer, it is effective because the compound is gradually migrated to the upper layer and is supplied to the surface of the magnetic layer. Like the case of the single layer, it should be added in 0.1 to 10 weight parts to 100 weight parts of ferromagnetic powder or non-magnetic powder, or more preferably in 1 to 5 weight parts.

An unsaturated fatty acid having 12 to 22 carbon atoms may be simultaneously used in the lubricant of the present invention. More concretely, the following substances may be used: Straight-chain unsaturated fatty acids such as 4-dodecenoic acid, 5-dodecenoic acid, 11-dodecenoic acid, cis-9-tridecenoic acid, myristoleic acid, 5-myristoleic acid, 6-pentadecenoic acid, 7-palmitoleic acid, cis-9-palmitoleic acid, 7-heptadecenoic acid, oleic acid, elaidic acid, cis-6-octadecenoic acid, trans-11-octadecenoic acid, cis-11-eicosenoic acid, cis-13-docosenoic acid (erucic acid), 15-tetracosenoic acid, 17-hexacosenoic acid, 17-hexacosenoic acid, cis-9,cis-12-octadienoic acid (linoleic acid), trans-9,trans-12-octadienoic acid, cis-9, trans-11,trans-13-octadecatrienoic acid, cis-9,cis-12,cis-15-octadecatrienoic acid, stearolic acid, etc., and branched unsaturated fatty acids such as 5-methyl-2-tridecenoic acid, 2-methyl-9-octadecenoic acid, 2-methyl-2-eicosenoic acid, 2,2-dimethyl-11-eicosenoic acid, etc.

More preferably, palmitoleic acid, oleic acid, erucic acid or linoleic acid may be used.

In the organic phosphorus compound expressed by the formulae (2) to (4) as simultaneously used with diester compound, R represents a substituted or unsubstituted alkyl group, alkenyl group or aryl group, and n represents 1 or 2.

More concretely, as the preferable organic phosphorus compound, the following substances may be used:

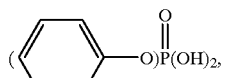 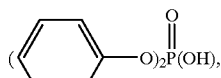

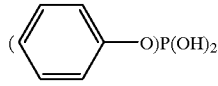 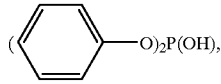

$C_6H_{13}OPO(OH)_2$, $(C_6H_{13}O)_2PO(OH)$, $C_6H_{13}OP(OH)_2$, $(C_6H_{13}O)_2PO(OH)$, $C_6H_{13}OP(OH)_2$, $(C_6H_{13}O)_2PO(OH)$, $C_6H_{13}P(OH)_2$, $(C_6H_{13})_2PO(OH)$, $C_8H_{17}OPO(OH)_2$, $C_{10}H_{21}OPO(OH)_2$, $C_{12}H_{25}OPO(OH)_2$, $C_{14}H_{29}OPO(OH)_2$, $C_{16}H_{33}OPO(OH)_2$, $C_{18}H_{37}OPO(OH)_2$, $C_8H_{17}PO(OH)_2$, $C_{10}H_{21}PO(OH)_2$, $C_{12}H_{25}PO(OH)_2$, $C_{14}H_{29}PO(OH)_2$, $C_{16}H_{33}OPO(OH)_2$, $C_{18}H_{37}OPO(OH)_2$, etc.

Among these substances, the following compound may be more preferably used:

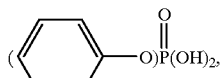 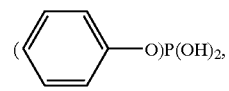

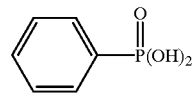

$C_{10}H_{21}OPO(OH)_2$, $C_{12}H_{25}OPO(OH)_2$, $C_{14}H_{29}OPO(OH)_2$, $C_{16}H_{33}OPO(OH)_2$, $C_{18}H_{37}OPO(OH)_2$, $C_8H_{17}PO(OH)_2$, $C_{10}H_{21}PO(OH)_2$, $C_{12}H_{25}PO(OH)_2$, $C_{14}H_{29}PO(OH)_2$, $C_{16}H_{33}OPO(OH)_2$, $C_{18}H_{37}OPO(OH)_2$, etc.

In case of the single magnetic layer, the organic phosphorus compound may be preferably used in 0.1 to 15 weight parts to 100 weight parts of the ferromagnetic powder, and more preferably in 1 to 10 weight parts. If it is contained more, durability may be decreased.

In case of the multiple magnetic layer, the organic phosphorus compound may be added to either the upper layer or the lower layer, or may be added to both. In case it is added only to the lower layer, it gradually migrates to the upper layer and is supplied to the surface of the magnetic layer. The quantity to be added is the same as in the case of the single layer.

As the ferromagnetic powder to be used in the magnetic layer of the present invention, it is preferable to use ferromagnetic alloy powder having α-Fe as principal component. In addition to the atoms as predetermined, the following atoms may be contained in the ferromagnetic powder: Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, etc. In particular, it is preferable that the powder contains at least one of Al, Si, Ca, Y, Ba, La, Nd, Co, Ni, and B in addition to α-Fe, or more preferably at least one of Co, Y, and Al. It is preferable that the content of Co is in the range from 0 to 40 atomic % inclusive, or more preferably from 15 to 35 atomic % inclusive, or most preferably from 20 to 35 atomic % inclusive. The content of Y is preferably in the range from 1.5 to 12 atomic % inclusive, or more preferably from 3 to 10 atomic % inclusive, or most preferably from 4 to 9 atomic % inclusive. Aluminum is preferably contained in 1 to 20 atomic % inclusive, or more preferably in 5 to 15 atomic % inclusive, or most preferably in 7 to 12 atomic % inclusive. The ferromagnetic powder may be treated with dispersing agent, lubricant, surface active agent, anti-static agent, etc. as described later in advance prior to dispersion. For further details, see JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, U.S. Pat. No. 3,026,215, U.S. Pat. No. 3,031,341, U.S. Pat. No. 3,100,194, U.S. Pat. No. 3,242,005, U.S. Pat. No. 3,389,014, etc.

Ferromagnetic alloy powder may contain small quantity of hydroxide or oxide. Any ferromagnetic alloy powder manufactured by the manufacturing methods already known may be used. These methods include: a method to reduce composite organic acid salt (mainly, oxalate) using reducing gas such as hydrogen, a method to reduce iron oxide using reducing gas such as hydrogen and to obtain Fe or Fe—Co particles, a method to thermally decompose metal carbonyl compound, a method to add a reducing agent such as sodium borohydride, hypophosphite, or hydrazine to aqueous solution of ferromagnetic metal and to reduce, a method to evaporate metal in inert gas under low pressure and to obtain fine powder, etc. The ferromagnetic alloy powder thus prepared may be used after processing by any of the following methods: a gradual oxidizing method already known, i.e. a method to immerse the alloy powder in an organic solvent and then to dry, a method to immerse the alloy powder in an organic solvent and then to form oxide film by supplying oxygen-containing gas and then to dry, and a method to form oxide film on the surface by adjusting partial pressure of oxygen gas and inert gas without using organic solvent.

If the ferromagnetic powder in the magnetic layer of the present invention is expressed by specific surface area according to BET method, it is 45 to 80 $m^2/g$, or more preferably 50 to 70 $m^2/g$. If it is 40 $m^2/g$ or less, noise increases. If it is 80 $m^2/g$ or more, it is not desirable because it is difficult to obtain surface with no irregularities when the magnetic layer is formed. Crystallite size of the ferromagnetic powder in the magnetic layer of the present invention is preferably 35 to 8 nm, or more preferably 25 to 10 nm, or most preferably 20 to 14 nm. Longer axis diameter of the ferromagnetic powder is 0.02 to 0.25 $\mu$m inclusive, or more preferably 0.05 to 0.15 $\mu$m inclusive, or most preferably 0.06 to 0.1 $\mu$m inclusive. Acicular ratio of the ferromagnetic powder is referably 3 to 15 inclusive, or more preferably 5 to 12 inclusive. In the magnetic metal powder, $\sigma$ s is preferably 100 to 180 emu/g, or more preferably 110 to 170 emu/g, or most preferably 125 to 160 emu/g. Coercive force of the metal powder is preferably 14,000 e to 35,000 e inclusive, or more preferably 18,000 e to 30,000 e inclusive.

Moisture content of the ferromagnetic metal powder is preferably 0.01 to 2%. It is preferable that moisture content of the ferromagnetic powder is optimized according to the type of the binder. It is preferable to optimize pH value of the ferromagnetic powder according to the combination with the binder used. The range of pH value is preferably 4 to 12, or more preferably 6 to 10. When necessary, the ferromagnetic powder may be processed by surface treatment using Al, Si, P, or oxide of these elements. The quantity of these elements used is in a range of 0.1 to 10% to the quantity of the ferromagnetic powder. It is preferable to perform surface treatment because adsorption of the lubricant such as fatty acid becomes 100 $mg/m^2$ or less. The ferromagnetic powder sometimes contains inorganic ions such as Na, Ca, Fe, Ni, Sr, etc. It is preferable that these ions are not present. If the ions are present in an amount of 200 ppm or less, few influence will be exerted on the properties of the ferromagnetic powder. It is preferable that the ferromagnetic powder used in the present invention has less holes. The holes may be present preferably in 20 volume % or less, or more preferably in 5 volume % or less. The ferromagnetic powder may be in any shape, i.e. needle-like, grain-like or spindle-like shape if the conditions for particle size as described above are satisfied. SFD of the ferromagnetic powder is preferably low, i.e. 0.8 or less. It is necessary to decrease distribution of Hc of the ferromagnetic powder. If SFD is 0.8 or less, electromagnetic transfer characteristics are satisfactory and output is high. Magnetization inversion is sharp and peak shift is reduced, and it is suitable for digital magnetic recording at high density. To decrease distribution of Hc, there are methods such as a method to narrow down the particle size distribution of goethite in the ferromagnetic metal powder or a method to prevent sintering.

As the ferromagnetic powder used in the magnetic layer of the present invention, hexagonal crystalline ferrite powder may be used. As the hexagonal crystalline ferrite, each of the substitution products such as barium ferrite, strontium ferrite, lead ferrite, calcium ferrite or Co-substitution product may be used. More concretely, barium ferrite and strontium ferrite of magnetoplumbite type, magnetoplumbite type ferrite with particle surface covered with spinel, or barium ferrite and strontium ferrite of magnetoplumbite type partially containing spinel phase may be used. These substances may contain, in addition to the predetermined atoms, the following atoms: Al, Si, S, Sc, Ti, V, Cr, Cu, Y, Mo, Rh, Pd, Ag, Sn, Sb, Te, Ba, Ta, W, Re, Au, Pb, Bi, La, Ce, Pr, Nd, P, Co, Mn, Zn, Ni, Sr, B, Ge, Nb, etc.

In general, substance added with the following elements may be used: Co—Ti, Co—Ti—Zr, Co—Ti—Zn, Ni—Ti—Zn, Nb—Zn—Co, Sb—Zn—Co, Nb—Zn, etc. Particle size is 10 to 200 nm in diameter of hexagonal plate, and it is more preferably 20 to 100 nm.

In the reproducing process using magnetic resistance head, it is necessary to have low noise, and it is preferable that plate diameter is 40 nm or less. If it is 10 nm or less, stable magnetization cannot be attained due to thermal fluctuation. If it is 200 nm or more, noise is increased, and both cases are not desirable for magnetic recording at high density. Planar ratio (plate diameter/plate thickness) is preferably 1 to 15, or more preferably 2 to 7. If planar ratio is low, it is preferable because filling property in the magnetic layer is increased, but good orientation property cannot be attained. If it is more than 15, noise is increased due to stacking between particles. In this particle size range, specific surface area according to BET method is 10 to 200 $m^2/g$. The specific surface area is generally consistent with arithmetically calculated value from plate diameter/plate thickness of the particle. Crystallite size is 5 to 45 nm, or more preferably 10 to 35 nm. In general, it is preferable that the distribution of plate diameter/plate thickness of the particle is lower. It is difficult to quantify the distribution, but it is possible to compare by measuring 500 particles at random using transmission electron micrograph of the particles. Distribution is not normal distribution in most cases. If it is expressed in standard deviation to mean size through calculation: $\sigma$/mean size=0.1 to 2.0. To narrow down the particle size distribution, it is recommended to equalize particle producing reaction system as much as possible, or treatment to improve distribution may be applied on the produced particles. For example, a treatment method to selectively dissolve ultra-fine particles in acid solution may be applied. It is possible to prepare the ferromagnetic powder with coercive force Hc of 5,000 e to 50,000 e. The higher the value of Hc is, the more advantageous it is for high density recording, and it is limited by ability of the recording head. It is usually in the range of 8,000 e to 40,000 e approximately, or more preferably in the range of 15,000 e to 35,000 e inclusive. In case saturation magnetization of the head exceeds 1.4 tesla, it is preferable to set the coercive force to 20,000 e or more. The value of Hc can be controlled by such factors as particle size (plate diameter/plate thickness), types and quantities of the elements contained, replacement site of the element, conditions for particle producing reaction, etc. Saturation magnetization $\sigma$ s is 40 to 80 emu/g. The higher the value of $\sigma$ s is, the more it is preferable. The finer the particle is, the more the value of $\sigma$ s tends to decrease. To improve the value of $\sigma$ s, the following methods are known: a method to combine spinel ferrite with magnetoplumbite ferrite, a method to select types and quantities of the contained elements, etc. Also, W type hexagonal crystalline ferrite can be used. When the ferromagnetic powder is dispersed, the surface of the ferromagnetic powder particles may be treated with a substance, which has affinity with the dispersing agent and the binder. As major compounds, oxides or hydroxides of Si, Al, P, etc., various types of silane coupling agent, or various types of titanium coupling agent may be used. These can be used in an amount of 0.1 to 10 weight % to the ferromagnetic powder.

Also, pH value of the ferromagnetic powder is important for dispersion. It is preferable that pH value is in the range of 4 to 12, or it is more preferable to be in the range of 6 to 10 in terms of chemical stability and storage property. Moisture contained in the ferromagnetic powder also exerts influence on dispersion, and moisture content is preferably in the range of 0.01 to 2.0%.

The hexagonal crystalline ferrite can be manufactured by one of the following procedures: (1) Glass crystallization method: Metal oxide to replace barium oxide, iron oxide and iron and boron oxide used as glass forming substance are mixed to have the desired ferrite composition, and the mixture is melted. Then, it is rapidly cooled down to turn to amorphous and is again processed by heat treatment. Then, it is washed and pulverized to obtain barium ferrite crystalline powder. (2) Hydrothermal reaction method: Metal salt solution having the desired barium ferrite composition is neutralized with alkali. After removing side product, it is heated in liquid phase at 100° C. or more. Then, it is washed, dried and pulverized to obtain barium ferrite crystalline powder. (3) Coprecipitation method: Metal salt solution having the desired barium ferrite composition is neutralized with alkali. After removing side product, it is dried and treated at less than 1100° C. Then, it is pulverized to obtain barium ferrite crystalline powder.

Next, description will be given on a case where diester and organic phosphoric acid of the present invention are used in the lower coating layer. Inorganic powder used in the lower coating layer of the present invention is non-magnetic powder, and it can be selected, for example, from inorganic compounds such as metal oxide, metal carbonate, metal sulfate, metal nitride, metal carbide, metal sulfide, etc. As the inorganic compounds, the following substances are used in combination or alone: For example, α-alumina with alpha ratio of 90% or more, β-alumina, γ-alumina, θ-alumina, silicon carbide, chromium oxide, cerium oxide, α-iron oxide, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. In particular, it is preferable to use titanium dioxide, zinc oxide, iron oxide and barium sulfate because particle distribution range is narrow and there are a number of means to provide functions. More preferably, titanium dioxide and α-iron oxide are used. Particle size of the non-magnetic powder is preferably in the range of 0.005 to 2 μm. When necessary, non-magnetic powder with different particle sizes may be mixed together or similar effect can be provided with single type of non-magnetic powder by widening the particle size distribution. Above all, it is preferable that particle size of the non-magnetic powder is in the range of 0.01 to 0.2 μm. In particular, in case the non-magnetic powder is particulate metal oxide, it has preferably average particle size of 0.08 μm or less. In case of needle-like metal oxide, longer axis length is preferably 0.3 μm or less. Tap density is preferably 0.05 to 2 g/ml, or more preferably 0.2 to 1.5 g/ml. Moisture content of the non-magnetic powder is preferably 0.1 to 5 weight %, or more preferably 0.2 to 3 weight %, or most preferably 0.3 to 1.5 weight %. It is preferable that pH value of the non-magnetic powder is in the range of 2 to 11, or more preferably 5.5 to 10. Specific surface area of the non-magnetic powder is preferably 1 to 100 m$^2$/g, or more preferably 5 to 80 m$^2$/g, or most preferably 10 to 70 m$^2$/g. Crystallite size of the non-magnetic powder is preferably 0.004 to 1 μm, or more preferably 0.04 to 0.1 μm. Oil absorption using DBP (dibutyl phthalate) is preferably 5 to 100 ml/100 g, or more preferably 10 to 80 ml/100 g, or most preferably 20 to 60 ml/100 g. Specific gravity is preferably 1 to 12, or more preferably 3 to 6. The powder may be of any shape, i.e. needle-like, spherical, polyhedron, or planar shape.

Ignition loss is preferably 20 weight % or less. The smaller the ignition loss is, the more it is desirable. It is preferable that the non-magnetic powder used in the present invention has Mohs hardness of 4 to 10 inclusive. Roughness factor of the surface of the powder is preferably 0.8 to 1.5, or more preferably 0.9 to 1.2. SA (stearic acid) adsorption of the non-magnetic powder is preferably 1 to 20 μmol/m$^2$, or more preferably 2 to 15 μmol/m$^2$, or most preferably 3 to 8 μmol/m$^2$. Heat of wetting to water of the non-magnetic powder at 25° C. is preferably in the range of 200 to 600 erg/cm$^2$. Also, a solvent having heat of wetting in this range may be used. It is preferable that it has pH value of 3 to 6. Water-soluble sodium contained in the non-magnetic powder is preferably in the range of 0 to 150 ppm, and water-soluble calcium in the range of 0 to 50 ppm.

It is preferable that surface of the non-magnetic powder is processed by surface treatment using $Al_2O_3$, $SiO_2$, $TiO_2$, $ZrO_2$, $SnO_2$, $Sb_2O_3$, $ZnO$, or $Y_2O_3$. To ensure better dispersion property, it is preferable to use $Al_2O_3$, $SiO_2$, $TiO_2$ or $ZrO_2$, or more preferably $Al_2O_3$, $SiO_2$ or $ZrO_2$. These substances may be used in combination or alone. According to each individual purpose, coprecipitated surface treatment layer may be used, or a method to treat the surface layer using silica after treating with alumina, or a method reversing this procedure may be adopted. The surface treatment layer may be porous or dense.

Concrete examples of the non-magnetic powder used for the lower coating layer of the present invention are as follows: Nanotite (manufactured by Showa Denko K.K.), HIT-100 and ZA-G1 (manufactured by Sumitomo Chemical Co., Ltd.), α Hematite DPN-250, DPN-250BX, DPN-245, DPN-270BX, DBN-SA1, DBN-SA3 (manufactured by Toda Kogyo Corporation), titanium oxide such as TTO-51B, TTO-55A, TTO-55B, TTO-55C, TTO-55S, TTO-55D, SN-100, α Hematite E270, E271, E300 and E303 (manufactured by Ishihara Sangyo Kaisha, Ltd.), titanium oxide such as STT-4D, STT-30D, STT-30, STT-65C, and α Hematite α-40 (manufactured by Titan Kogyo K.K.), MT-100S, MT-100T, MT-150W, MT-500B, MT-600B, MT-100F, MT-500HD (manufactured by Teika, Ltd.), FINEX-25, BF-1, BF-10, BF-20, and ST-M (manufactured by Sakai Chemical Industry Co., Ltd.), DEFIC-Y and DEFIC-R (manufactured by Dowa Mining Co., Ltd.), AS2BM and $TiO_2P25$ (manufactured by Nippon Aerogil Co., Ltd.), and 100A and 500A (manufactured by Ube Corporation), or products obtained by firing these substances.

The non-magnetic powder most preferably used includes titanium dioxide and α-iron oxide. α-iron oxide (hematite) can be prepared by the procedures described below. Specifically, α-$Fe_2O_3$ particle powder used in the present invention can be obtained by one of the following methods: (1) Suspension solution containing ferrous hydroxide colloid is obtained by adding aqueous solution of alkali hydroxide in equivalent amount or more to ferrous salt aqueous solution, and it is adjusted to have pH value of 11 of more. Then, it is oxidized by passing oxygen-containing gas through it at temperature of not more than 80° C., and needle-like goethite particles are prepared. (2) Oxygen-containing gas is passed through suspension solution which contains $FeCO_3$ obtained by reaction of aqueous solution of ferrous salt with aqueous solution of alkali carbonate, and spindle-like goethite particles are obtained. (3) Oxygen-containing gas is passed through ferrous salt aqueous solution, which contains ferrous hydroxide obtained by adding aqueous solution of alkali hydroxide or aqueous solution of alkali carbonate of less than the equivalent amount to aqueous solution of ferrous salt, and needle-like goethite particles are prepared. Then, to the ferrous salt aqueous solution containing the needle-like goethite nuclear particles, aqueous solution of alkali hydroxide of more than the equivalent amount to $Fe^{2+}$ in the ferrous salt aqueous solution is added. Then, oxygen-containing gas is passed through the solution, and needle-like goethite nuclear particles are prepared. (4) Oxygen-containing gas is passed through ferrous salt aqueous solution which contains ferrous hydroxide colloid obtained by adding aqueous solution of alkali hydroxide or alkali carbonate of less than the equivalent amount to ferrous salt aqueous solution, and needle-like goethite nuclear particles are prepared. Then, the needle-like goethite nuclear particles are obtained in acidic or neutral region. The needle-like goethite particles thus prepared are used as precursor particles.

The other elements such as Ni, Zn, Si, etc., which are usually added to improve properties of particle powder, may be added during the reaction to produce goethite particles. The needle-like goethite particles, which are precursor particles, are dehydrated at temperature range of 200 to 500° C. or are annealed in temperature range of 350 to 800° C. by heat treatment, and needle-like $\alpha\text{-}Fe_2O_3$ particles are prepared. On the surface of the needle-like goethite particles to be dehydrated or annealed, sintering inhibitor such as P, Si, B, Zr, Sb, etc. may be attached. Annealing by heat treatment in temperature range of 350 to 800° C. is preformed because it is preferable to melt the particle surface by annealing and to close the holes on the surface of the needle-like $\alpha\text{-}Fe_2O_3$ particles prepared by dehydration in order to have smooth surface.

The $\alpha\text{-}Fe_2O_3$ particle powder used in the present invention is obtained as follows: The needle-like $\alpha\text{-}Fe_2O_3$ particles obtained by dehydration or annealing are dispersed in aqueous solution to turn to suspension solution. Aluminum compound is added and pH value is adjusted, and the surface of the $\alpha\text{-}Fe_2O_3$ particles is covered with the adding compound as described above. Then, by filtering, washing, drying, pulverizing, or by deaeration and compaction treatment when necessary, the desired $\alpha\text{-}Fe_2O_3$ particle powder can be obtained. As the aluminum compound, aluminum salt such as aluminum acetate, aluminum sulfate, aluminum chloride, aluminum nitrate, etc. or alkali aluminate such as sodium aluminate may be used. In this case, the aluminum compound is added in an amount of 0.01 to 50 weight % (converted to aluminum) to $\alpha\text{-}Fe_2O_3$ particle powder. If it is added in a ratio of less than 0.01 weight %, dispersion in the binder resin is not satisfactory. If it is added in a ratio of more than 50 weight %, it is not desirable because aluminum compounds floating on particle surface exert action on each other. In the non-magnetic powder for the lower layer in the present invention, in addition to the aluminum compound, Si compound, or one or two types or more of the compounds selected from P, Ti, Mn, Ni, Zn, Zr, Sn, and Sb may be used for coating. The quantity of these compounds used together with the aluminum compound is preferably in a range of 0.01 to 50 weight % to $\alpha\text{-}Fe_2O_3$ particle powder. If it is added in a ratio of less than 0.01 weight %, almost no effect can be expected for the improvement of dispersion property. If it is added in a ratio of more than 50 weight %, the compounds floating in the regions other than the particle surface exert action on each other, and this is not desirable.

For titanium dioxide, surface coating may be applied using hydroxide of metal such as Al, Si, Ti, Zr, Sb, Sn, Zn, etc. manufactured by sulfuric acid method or chlorine method.

By mixing carbon black in the lower coating layer, it is possible to decrease surface electric resistance Rs and to reduce light transmittance, and also to obtain the desired micro Vickers hardness. By adding carbon black to the lower layer, it is possible to have an effect for lubricant storage. The types of carbon black to be used include: furnace black for rubber, thermal black for rubber, black for color, acetylene black, etc. In the carbon black in the lower layer the properties as given below should be optimized and the better effect may be obtained by simultaneous use of these substances.

Specific surface area of the carbon black for the lower layer is preferably 100 to 500 $m^2/g$, or more preferably 150 to 400 $m^2/g$. DBP oil absorption is preferably 20 to 400 ml/100 g, or more preferably 30 to 200 ml/100 g. Particle size of the carbon black is preferably 5 to 80 $\mu$m, or more preferably 10 to 50 $\mu$m, or most preferably 10 to 40 $\mu$m. In the carbon black, it is preferable that pH value is 2 to 10, moisture content is 0.1 to 10%, and tap density is 0.1 to 1 g/ml. Concrete examples of the carbon black to be used in the present invention are as follows: Blackpearls 2000, 1300, 1000, 900, 800, 880, 700, and Vulcan XC-72 (manufactured by Cabot), #3050B, #3150B, #3250B, #3750B, #3950B, #950, #650B, #970B, #850B, MA-600, MA-230, #4000, and #4010 (manufactured by Mitsubishi Chemical Industry Co., Ltd.), Conductex SC, Raven 8800, 8000, 7000, 5750, 5250, 3500, 2100, 2000, 1800, 1500, 1255, and 1250 (manufactured by Columbia Carbon Co.), and Ketchenblack EC (manufactured by Akzo). Carbon black may be processed by surface treatment using dispersing agent or may be grafted with resin or a part of the surface may be grafted and used. Prior to the adding of carbon black to the coating material, it may be dispersed using binder. The carbon black can be used in a ratio of not more than 50 weight % to the inorganic powder and in a range of not more than 40% of total weight of the non-magnetic layer. These carbon blacks may be used in combination or alone.

For the lower coating layer, acryl styrene type resin powder, benzoguanamine resin powder, melamine type resin powder, or phthalocyanine type pigment may be used. Also, polyolefine type resin powder, polyester type resin powder, polyamide type resin powder, polyimide type resin powder, or polyethylene fluoride resin may be used. To manufacture these types of powder, the methods described in JP-A-62-18564 or JP-A-60-255827 may be used.

For binder resin, lubricant, dispersing agent, additive, solvent dispersing method, etc. for the lower coating layer, those for the magnetic layer as described below may be used. In particular, for quantity and type of binder resin, additives, quantity and type of dispersing agent, those for the magnetic layer may be applied.

The magnetic coating material prepared from the above materials is coated on a non-magnetic support, and a magnetic layer is formed.

As the non-magnetic support used in the present invention, polyethylene naphthalate, polyethylene terephthalate, polyamide, polyimide, polyamideimide, aromatic polyamide, polybenzoxydazole, etc. processed by biaxial stretching may be used. More preferably, polyethylene naphthalate or aromatic polyamide may be used. These non-magnetic supports may be processed in advance by corona discharge, plasma treatment, treatment to make more easily adhesive, heat treatment, etc. The non-magnetic support used in the present invention has preferably such surface smoothness that average surface roughness at central line is in the range of 0.1 to 20 nm under cut-off value of 0.25 mm, or more preferably in the range of 1 to 10 nm. It is also preferable that the non-magnetic support not only has lower average surface roughness at central line but also has no excessive projection of more than 1 μm.

The magnetic recording medium of the present invention can be manufactured, for example, by the following method: On the surface of a non-magnetic support under running condition, a coating solution for the magnetic layer is coated so that thickness of the magnetic layer after drying will be within the range of 0.05 to 5 μm, or more preferably 0.07 to 1 μm. In this case, a plurality of magnetic coating materials may be coated in multiple layers sequentially or at the same time.

As coating device to coat the above magnetic coating material, the following devices may be used: air doctor coat, blade coat, rod coat, extrusion coat, air knife coat, squeeze coat, impregnation coat, reverse roll coat, transfer roll coat, gravure coat, kiss coat, cast coat, spray coat, spin coat, etc.

For further details, reference should be made, for example, to "The Newest Coating Technique" published by Sogo Gijutsu Center, Ltd. (May 31, 1983).

In case the present invention is applied to a magnetic recording medium comprising two layers or more, the following can be recommended as examples of the coating device and method:

(1) Using a coating device such as gravure, roll, blade, extrusion, etc. generally applied in the coating of the coating material, the lower layer is coated at first. While the lower layer is not yet dried, the upper layer is coated using a support pressurizing type extrusion coating device as disclosed, for example, in JP-B-1-46186, JP-A-60-238179, JP-A-2-265672, etc.

(2) Using a coating head having two slits for allowing the coating solution to pass as disclosed in JP-A-63-88080, JP-A-2-17971 or JP-A-2-265762, the upper and the lower layers are coated almost at the same time.

(3) Using an extrusion coating device equipped with backup roll as disclosed in JP-A-2-174965, the upper and the lower layers are coated almost at the same time.

On the surface (where the coating material is not coated) of the non-magnetic support used in the present invention, a back-coating layer (backing layer) may be provided. The back-coating layer is a layer, which is produced by coating a coating material to form back-coating layer (i.e. a coating material where particulate components such as abrasive material, anti-static material, etc. and the binder are dispersed in an organic solvent) on the uncoated surface of the non-magnetic support. As the particulate component, various types of inorganic pigments or carbon black may be used. As the binder, nitrocellulose, or resin such as phenoxy resin, vinyl chloride type resin, polyurethane, etc. may be used alone or as mixture.

An adhesive layer may be provided on the surface of the non-magnetic support coated with the magnetic coating material and also with the coating material to form the back-coating layer.

The coating layer coated with the magnetic coating material is dried after magnetic field orientation processing is performed on the ferromagnetic powder contained in the coating layer of the magnetic coating material.

After it has been dried as described above, surface smoothening treatment is carried out on the coating layer. For the surface smoothening treatment, super calender roll is used, for example. By the surface smoothening treatment, the holes generated due to removal of the solvent during drying are eliminated, and filling ratio of the ferromagnetic powder in the magnetic layer is improved. This makes it possible to obtain a magnetic recording medium having high electromagnetic transfer characteristics.

As the calender processing roll, heat-resistant plastic roll made of epoxy, polyimide, polyamide, polyamideimide, etc. is used. Or, a metal roll may be used.

When the diester compound of the present invention is combined with organic phosphorus compound, unexpected effects can be attained, i.e. dispersion property and dispersion stability of the ferromagnetic powder are improved. Smoothness of the coated surface is also improved, and better electromagnetic transfer characteristics can be obtained. This tendency is particularly remarkable in a magnetic layer of multi-layer type and in a multi-layer type medium of magnetic layer/non-magnetic layer. Further, when unsaturated fatty acid is added, crystal depositing phenomenon of saturated fatty acid, in particular, depositing phenomenon at low temperature storage, is very unlikely to occur, and stability is ensured.

EMBODIMENTS

In the following, description will be given on examples of the present invention.

EXAMPLE 1 TO 12, AND COMPARATIVE EXAMPLES 1 TO 3

Preparation of the Magnetic Solution for the Upper Layer

Using an open kneader, 100 parts of ferromagnetic alloy powder (composition: Co 20 atomic %, Al 9 atomic %, and Y 6 atomic % to 100 atomic % of Fe; Hc 2,000 Oe, crystallite size 15 nm, BET specific surface area 59 m$^2$/g, longer axis diameter 0.09 μm, acicular ratio 7, σ s 140 emu/g) were pulverized for 10 minutes. Then, 7.5 parts of a compound ($SO_3Na=6\times10^{-5}$ eq/g; epoxy=$10^{-3}$ eq/g; weight average molecular weight 30,000), which was obtained by adding hydroxyethyl sulfonate sodium salt to copolymer of vinyl chloride/vinyl acetate/glycidyl methacrylate/2-hydroxypropylallyl ether (86:5:5:4), were kneaded with 10 parts (solid) of polyurethane resin (polyester polyurethane; $SO_3Na=7\times10^{-5}$ eq/g; containing terminal OH group; weight average molecular weight 40,000; Tg 90° C.) and 60 parts of organic phosphorus compound of Table 1 and cyclohexanone for 60 minutes. Then, the following compounds were added:

| | |
|---|---|
| Adhesive ($Al_2O_3$; particle size 0.3 μm) | 2 parts |
| Carbon black (particle size 40 nm) | 2 parts |
| Methylethylketone/toluene = 1/1 | 200 parts |

And the mixture was dispersed in a sand mill for 120 minutes. Then, the following compounds were added:

| | |
|---|---|
| Polyisocyanate (Nippon Polyurethane Co.; Coronate 3041) | 5 parts (solid) |
| Lubricant shown in Table 1 | 2 parts |
| Stearic acid | 1 part |
| Methylethylketone | 50 parts |

The mixture was further agitated and mixed for 20 minutes and was then filtered using a filter having average pore size of 1 μm, and the magnetic coating material was prepared.

Preparation of Non-Magnetic Solution for the Lower Layer

Using an open kneader, 85 parts of titanium oxide (average particle size 0.035 μm; crystal type rutile; $TiO_2$ content 90% or more; surface treatment layer: alumina; BET specific surface area 35 to 42 m²/g; true specific gravity 4.1; pH 6.5 to 8.0) was pulverized for 10 minutes. Then, 11 parts of a compound ($SO_3Na=6\times10^{-5}$ eq/g; epoxy=$10^{-3}$ eq/g; weight average molecular weight 30,000), which was obtained by adding hydroxyethyl sulfonate sodium salt to copolymer of vinyl chloride/vinyl acetate/glycidyl methacrylate (86:9:5), were kneaded with 10 parts (solid) of polyurethane resin containing sulfonic acid (Toyobo; UR8700) and 60 parts of organic phosphorus compound of Table 1 and cyclohexanone for 60 minutes. Then,

| | |
|---|---|
| Methylethylketone/cyclohexanone = 6/4 | 200 parts |
| were added, and the mixture was dispersed in a sand mill for 120 minutes. Further, the lubricant of Table 1 and the following compounds were added: | |
| Stearic acid | 1 part |
| Methylethylketone | 50 parts |

After agitating and mixing further for 20 minutes, the mixture was filtered using a filter having average pore size of 1 μm, and a non-magnetic coating material was prepared.

The non-magnetic coating material thus prepared was coated by simultaneous multi-layer coating on the surface of a polyethylene terephthalate support of 62 μm in thickness so that the thickness of the non-magnetic coating material was to be 1.5 μm, and immediately after, the magnetic coating material was coated to have thickness of 0.2 μm when dried. While both layers were not yet dried, the support was passed through an AC magnetic field generating system with two different magnetic field intensities (frequency 50 Hz, 250 gauss; or frequency 50 Hz, 120 gauss) to perform random orientation processing. Further, after being dried, calender treatment (speed 100 m/min.; linear pressure 300 kg/cm; temperature 90° C.) was performed by combination of metal roll—metal roll—metal roll—metal roll—metal roll—metal roll—metal roll. It was stamped out to have a 3.7-inch disk and surface polishing was performed. Then, it was placed in a disk cartridge (manufactured by Iomega; for Zip) with liner provided inside, and magnetic disks for the tests of Examples and Comparative examples were prepared.

EXAMPLE 13

By the same procedure as in Example 8 except that the ferromagnetic alloy powder A was replaced with B (composition: Co 20 atomic % and Y 6 atomic % to 100 atomic % of Fe; Hc 20,000 e, crystallite size 15 nm; BET specific surface area 59 m²/g; longer axis diameter 0.09 μm; acicular ratio 7; σ s 140 emu/g), magnetic disks for tests were prepared in Example 3.

TABLE 1

| Example and Comparative example | Organic phosphourus compounds Type and q'ty (weight parts) | Lubricant Diester compound (all in 10 weight parts) $R^1$ | $R^2$ | Unsaturated fatty acid Type and q'ty (weight parts) | | Ferromagnetic powder type |
|---|---|---|---|---|---|---|
| 1 | ph—O—PO(OH)$_2$ 3 | CH$_3$(CH$_2$)$_4$ | Same as left | Oleic acid | 2 | A |
| 2 | ph—O—PO(OH)$_2$ 3 | CH$_3$(CH$_2$)$_6$ | Same as left | Oleic acid | 2 | A |
| 3 | ph—O—PO(OH)$_2$ 3 | CH$_3$(CH$_2$)$_8$ | Same as left | Oleic acid | 2 | A |
| 4 | ph—O—PO(OH)$_2$ 3 | CH$_3$(CH$_2$)$_{10}$ | Same as left | Oleic acid | 2 | A |
| 5 | ph—O—PO(OH)$_2$ 3 | CH$_3$(CH$_2$)$_{12}$ | Same as left | Oleic acid | 2 | A |
| 6 | ph—O—PO(OH)$_2$ 3 | CH$_3$(CH$_2$)$_{16}$ | CH$_3$(CH$_2$)$_{12}$ | Oleic acid | 2 | A |
| 7 | ph—O—PO(OH)$_2$ 3 | CH$_3$(CH$_2$)$_{20}$ | Same as left | Oleic acid | 2 | A |
| 8 | ph—PO(OH)$_2$ 3 | CH$_3$(CH$_2$)$_8$ | Same as left | Oleic acid | 2 | A |
| 9 | C$_{12}$H$_{25}$PO(OH)$_2$ 3 | CH$_3$(CH$_2$)$_8$ | Same as left | Oleic acid | 2 | A |
| 10 | ph—PO(OH)$_2$ 3 | CH$_3$(CH$_2$)$_8$ | Same as left | Palmitoleic acid | 2 | A |
| 11 | ph—PO(OH)$_2$ 3 | CH$_3$CH(CH$_3$)(CH$_2$)$_9$ | Same as left | Oleic acid | 2 | A |
| 12 | ph—PO(OH)$_2$ 3 | CH$_3$(CH$_2$)$_8$ | Same as left | None | 0 | A |
| 13 | ph—PO(OH)$_2$ 3 | CH$_3$(CH$_2$)$_8$ | Same as left | Oleic acid | 2 | B |
| 14 | C$_{10}$H$_{21}$OPO(OH)$_2$ 3 | CH$_3$(CH$_2$)$_4$ | Same as left | Oleic acid | 2 | A |
| 15 | ph—O—PO(OH)$_2$ 3 | CH$_3$(CH$_2$)$_4$ | Same as left | Oleic acid | 2 | A |
| 16 | C$_{10}$H$_{12}$O—P(OH)$_2$ 3 | CH$_3$(CH$_2$)$_4$ | Same as left | Oleic acid | 2 | A |
| 17 | C$_{10}$H$_{12}$—PO(OH)$_2$ 3 | CH$_3$(CH$_2$)$_4$ | Same as left | Oleic acid | 2 | A |
| 18 | (C$_{10}$H$_{12}$)$_2$—PO(OH) 3 | CH$_3$(CH$_2$)$_4$ | Same as left | Oleic acid | 2 | A |
| 1 | ph—O(CH$_2$CH$_2$O)$_2$PO(OH)$_2$ 3 | Neopentyl glycol dioleate | | None | 0 | A |
| 2 | None 0 | Neopentyl glycol dioleate | | None | 0 | A |
| 3 | ph—O—PO(OH)$_2$ 3 | Butyl stearate | | Oleic acid | 2 | A |

In Table 1, the symbol "ph" indicates a benzene ring. Diester compound indicates $R^1$ and $R^2$ of the diester of the formula (1). For a compound where $R^1$ is identical with $R^2$, it is described as "same as left" in the column for $R^2$.

The properties of the magnetic recording medium in each of Examples and Comparative examples prepared as described above were determined by the measuring methods given below. The results are summarized in Table 2.

Measuring Method (1) Electromagnetic Transfer Characteristics

Using a magnetic disk evaluation system (manufactured by GUZIK; RWA1001), a spin stand (manufactured by Kyodo Electronic System; LS-90), and a metal-in-gap head with gap length of 0.3 $\mu$m, reproduction output (TAA) at linear recording density of 60 kfci at a position of radius of 24.6 mm and noise level after DC demagnetization were measured, and S/N value was obtained. Relative S/N value was evaluated with the S/N value in Comparative example 1 as 0 dB.

(2) Surface Roughness Ra

By optical interference method using digital optical profimeter (manufactured by WYKO), average roughness at central line was measured under cut-off value of 0.25 mm, and this was regarded as Ra.

(3) Running Durability

Using a drive unit (manufactured by Iomega; ZIP100), recording was performed at 2968 rpm with the head fixed at a position of radius of 38 mm and with recording density of 34 kfci. Then, the signal was reproduced and this was regarded as 100%. Thereafter, under thermal testing environment with the flow given below as one cycle, this was run for 1,500 hours. Output was measured at every 24 hours of running. When the measured value reached 70% or less of the initial value, this was regarded as service life and was expressed in hours. 25° C. and 50% RH for 1 hour→temperature increase for 2 hours→60° C. and 20% RH for 7 hours→temperature decrease for 2 hours→25° C. and 50% RH for one hour→temperature decrease for 2 hours→5° C. and 10% RH for 7 hours→temperature increase for 2 hours.

(4) Running Durability After Being Stored Under High Temperature and High Humidity Conditions After a specimen disk has been stored for 8 weeks under an atmosphere of 60° C. and 90% RH, running durability was measured by the procedure of (3) above.

(5) Low Temperature Storage Property

After a specimen disk has been stored for 8 weeks under the conditions of 0° C., the surface of the magnetic layer was visually inspected. If white fine crystal was deposited, this was defined as "no good", and if no change was observed, it was defined as "very good". When the white crystal was analyzed by gas chromatography, it was identified as stearic acid.

(6) Calender Roll Contamination

After a specimen disk has been processed by calender treatment (200 m), calender roll was visually checked. If any attached object was found on the magnetic layer, it was defined as "no good". If no attached object was observed, it was defined as "very good".

TABLE 2

|  | S/N (dB) | Ra (nm) | Running durability (h) | Durability after storage (h) | Low temperature storage property | Calender roll contamination |
|---|---|---|---|---|---|---|
| Example 1 | 1.1 | 2.7 | 1500 or more | 1500 or more | Very good | Very good |
| Example 2 | 1 | 2.5 | 1500 or more | 1500 or more | Very good | Very good |
| Example 3 | 0.9 | 2.6 | 1500 or more | 1500 or more | Very good | Very good |
| Example 4 | 1.1 | 2.7 | 1500 or more | 1500 or more | Very good | Very good |
| Example 5 | 1 | 2.6 | 1500 or more | 1500 or more | Very good | Very good |
| Example 6 | 1 | 2.5 | 1500 or more | 1500 or more | Very good | Very good |
| Example 7 | 0.9 | 2.7 | 1500 or more | 1500 or more | Very good | Very good |
| Example 8 | 0.8 | 2.8 | 1500 or more | 1500 or more | Very good | Very good |
| Example 9 | 1 | 2.7 | 1500 or more | 1500 or more | Very good | Very good |
| Example 10 | 1 | 2.7 | 1500 or more | 1500 or more | Very good | Very good |
| Example 11 | 1.3 | 2.3 | 1500 or more | 1500 or more | Very good | Very good |
| Example 12 | 1.3 | 2.3 | 1500 or more | 1500 or more | Very good | Very good |
| Example 13 | 1.4 | 2.4 | 1500 or more | 1440 | Very good | Very good |
| Example 14 | 0.9 | 2.8 | 1500 or more | 1500 or more | Very good | Very good |
| Example 15 | 0.9 | 2.8 | 1500 or more | 1500 or more | Very good | Very good |
| Example 16 | 1.0 | 2.7 | 1500 or more | 1500 or more | Very good | Very good |
| Example 17 | 0.9 | 2.8 | 1500 or more | 1500 or more | Very good | Very good |
| Example 18 | 0.8 | 2.9 | 1500 or more | 1500 or more | Very good | Very good |
| Comparative example 1 | 0 | 3.5 | 480 | 384 | No good | No good |
| Comparative example 2 | −1.3 | 4.2 | 480 | 360 | No good | No good |
| Comparative example 3 | 0 | 3.5 | 240 | 48 | No good | Very good |

As described above, diester and organic phosphoric acid were used in the present invention, and this contributes to the improvement of running durability of the magnetic recording medium. Also, this makes it possible to obtain a magnetic recording medium, which exhibits good storage property under high temperature and high humidity conditions, shows better running durability after storage, has minimum contamination of calender roll and exhibits higher productivity. Also, it is possible to obtain a magnetic recording medium, which has smooth coating film, has better electromagnetic transfer characteristics, and in which crystal deposition of saturated fatty acid is very unlikely to occur during storage at low temperature.

What we claim is:

1. A magnetic recording medium, comprising a magnetic layer having ferromagnetic powder and a binder dispersed therein, said magnetic layer being provided on a non-magnetic support, whereby said magnetic layer contains a diester compound expressed by a chemical formula (1) given below:

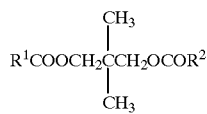

(1)

where $R^1$ and $R^2$ each represents a saturated hydrocarbon group having 5 to 21 carbon atoms, and at least one organic phosphorus compound expressed by the chemical formulae (2) to (4):

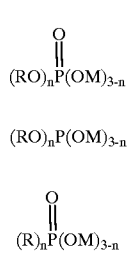

where R represents a substituted or unsubstituted alkyl group, alkenyl group or aryl group, and n represents 1 or 2, and M represents a hydrogen atom, an alkali metal or an alkali earth metal.

2. A magnetic recording medium according to claim 1, wherein said magnetic layer contains an unsaturated fatty acid having 12 to 22 carbon atoms.

3. A magnetic recording medium according to claims 1 or 2, wherein a non-magnetic layer having inorganic powder dispersed in a binder is provided between said non-magnetic support and the magnetic layer, and said magnetic layer has a thickness of not more than 1 $\mu$m when dried.

4. A magnetic recording medium according to claim 1, wherein said magnetic recording medium is a magnetic disk used in a recording and reproducing system with number of revolutions of not lower than 700 rpm.

5. A magnetic recording medium according to claim 1, wherein said ferromagnetic powder is $\alpha$-Fe containing a material selected from the group consisting of Co, Y, Al and mixtures thereof.

6. A magnetic recording medium according to claim 1, wherein said ferromagnetic powder has a crystallite size of 35 to 8 nm.

7. A magnetic recording medium according to claim 1, wherein a longer axis diameter of said ferromagnetic powder is within the range of 0.02 to 0.25 $\mu$m.

8. A magnetic recording medium according to claim 1, wherein the saturation magnetization of said ferromagnetic powder is 100 to 180 emu/g.

9. A magnetic recording medium according to claim 3, wherein said inorganic powder is a non-magnetic powder.

10. A magnetic recording medium according to claim 9, wherein said non-magnetic powder is titanium oxide or $\alpha$-iron oxide.

11. A magnetic recording medium according to claim 9, wherein said non-magnetic powder has an average particle size of 0.01 to 0.2 $\mu$m.

12. A magnetic recording medium according to claim 9, wherein said non-magnetic powder of the lower layer is particulate metal having an average particle size of not more than 0.08 $\mu$m, or needle-like metal oxide having a longer axis diameter of not more than 0.3 $\mu$m.

13. A magnetic recording medium according to claim 9, wherein said non-magnetic powder has a specific surface area of 1 to 100 $m^2/g$.

14. A magnetic recording medium according to claim 9, wherein said non-magnetic powder has a pH value in the range of 2 to 11.

15. A magnetic recording medium according to claim 9, wherein said non-magnetic powder has a true specific gravity of 3 to 6.

16. A magnetic recording medium according to claim 9, wherein said non-magnetic powder is processed by surface treatment.

* * * * *